Sept. 5, 1933. L. CAMPBELL, JR 1,925,712
LAND VEHICLE STEERING GEAR
Original Filed May 11, 1929

Inventor
LORN CAMPBELL, JR.
By Richey & Watts
Attorney

Patented Sept. 5, 1933

1,925,712

UNITED STATES PATENT OFFICE 1,925,712

LAND VEHICLE STEERING GEAR

Lorn Campbell, Jr., Cleveland, Ohio

Application May 11, 1929, Serial No. 362,156
Renewed February 1, 1933

2 Claims. (Cl. 280—33.55)

This invention relates to land vehicles and is particularly concerned with means for steering one or more trailer vehicles of a train which includes a tractor and a trailer or trailers.

The art of land vehicle trains has, so far as I am aware, been developed only for freight handling uses where the service conditions and safety requirements are materially less severe than where passenger traffic is concerned. Although my invention is applicable to land vehicle trains for transporting freight, it is of great importance in trains for transporting passengers.

One of the outstanding requirements of a land vehicle train is that of being able to steer the trailer or trailers so that the latter will follow closely the path traversed by the tractor of the train since it is essential from the standpoint of safety and economy of road space that the trailers do not run out of the lane of travel traversed by the tractor particularly in rounding curves, passing parked vehicles or vehicles going in the same direction and in turning corners.

By my present invention I am enabled to steer both the front and rear wheels of the trailers of a land vehicle train so that these requirements are fully satisfied and so that each trailer will follow substantially the same tracks as the tracks of the other trailers so that all the trailers will follow the lane in which the tractor moves.

In the drawing accompanying this specification

Referring now to the drawing wherein like parts are designated by like reference characters.

Figure 1:
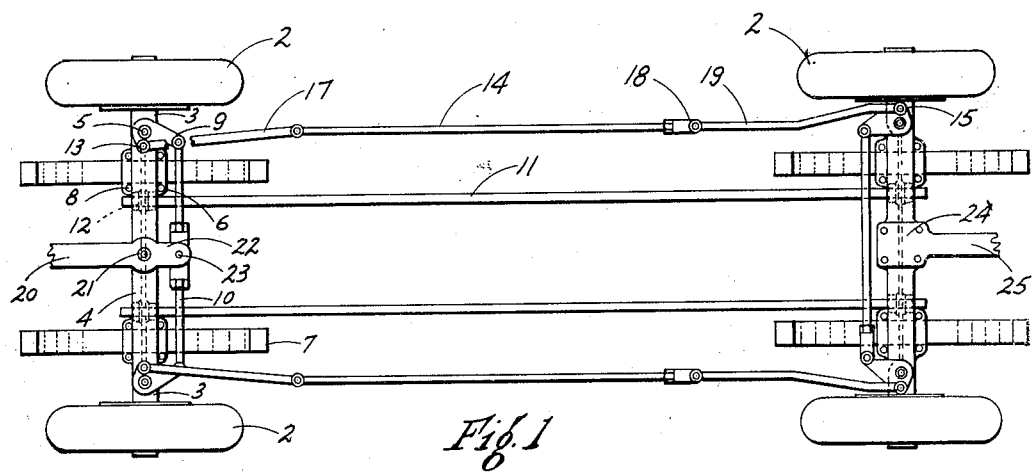
Fig. 1 is a top plan view of a land vehicle trailer embodying one form of my invention.
Figure 2:
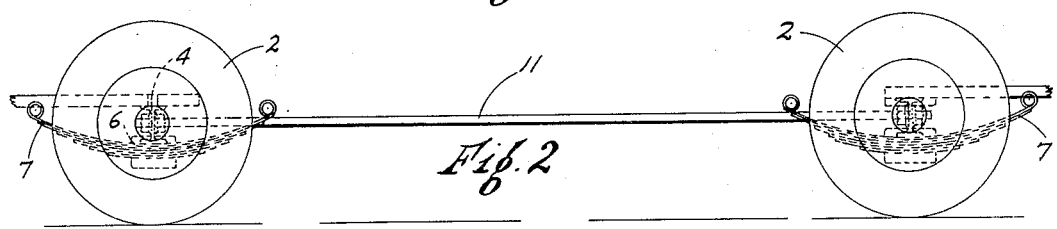
Fig. 2 is a side elevation of the device of Fig. 1.

In Fig. 1, I have shown a running gear for a trailer or the like which comprises resiliently tired wheels 2 rotatably mounted on stub-axles which are swivelly journalled on the end of fixed axles 4 and secured thereto by spindle body bolts 5.

The fixed axles are of substantially I-shaped cross section and are each provided with a pair of enlarged portions adapted to form chairs 6 to support a semi-elliptic spring 7. The springs are suspended under the axle by U-bolts which extend around the spring and through apertures in the chair 6 and secured thereon by suitable lock washers and nuts 8.

Each of the spindles which support the stub-axles is provided with a spindle arm or lever 9, the arms of the spindles carried by the front axle extending rearward and those for the rear axle extending toward the front. Adjustable tie rods 10 connect the spindle arms of each axle in the usual manner.

Each axle is provided with a pair of transverse apertures disposed in the axle above the springs into which are disposed rods 11. The rods are adjustably secured to the axles by nuts 12 screwed on the threaded ends of the rods on both sides of the axle. The rods are adapted to space the axles apart in parallel relation to each other. The nuts 12 and threaded ends of the rods permit the axles to be adjusted so that they may be maintained in parallel alignment with each other.

Each of the spindle bodies is also provided with relatively short arms or levers 13 those for the front axle extending toward each other, and the levers 15 for the rear axle extending in the opposite direction. Steering rods 14 extend from the front to the rear linking the levers 13 and 15 together on each side of the vehicle. The steering rods comprise a relatively short rod 17 pivotally secured to the lever 13 at the front end and pivotally secured to a relatively long rod 14 which has on the other end an adjustable clevis 18. A short curved rod 19 is pivoted to the rod 14 and has other end attached to the short lever 15 of the rear spindle body.

The opposite side of the vehicle is provided with a similar linkage.

The lever 20 of a draw bar is pivoted to the front axle at 21 and is provided with a short rearwardly extending lever 22 which is pivotally secured at 23 to the tie rod 10. The rear axle may be provided with an intermediate flat portion 24 adapted to act as a chair to which may be bolted a draw rod 25, adapted to be connected to a drawn vehicle.

Figure 3:
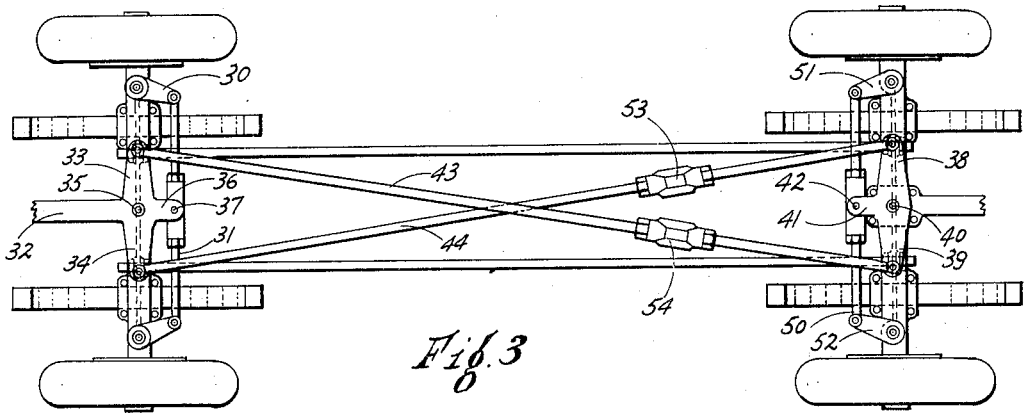
Fig. 3 is a view similar to Figure 1 showing a modified form of construction embodying my invention.

As best shown in Fig. 3 I have provided another running gear which comprises the axles and longitudinally extending rods similar to that of Fig. 1. The spindle bodies, however, which support the wheels upon a stub axle and which are swivelly journalled to the axles, are each provided with a single spindle arm lever 30. Each pair of spindle arms for an axle are connected together by an adjustable tie rod 31. The lever 32 extending from the draw bar is of substantially X shape being provided with a pair of oppositely extending arms 33 and 34 and is pivoted at 35 to the axle. A relatively short lever 36 extends rearward and is pivotally secured to the tie rod 31 at 37.

The rear axle is provided with a substantially T shaped lever comprising two arms 38 and 39 which extend in opposite directions parallel to the axle and correspond to the arms 33 and 34 of the lever on the front axle. The lever is pivoted to the axle at 40 and is provided with a relatively short lever 41 which extends toward the front axle and is pivotally connected to the tie rods at 42. The ends 33 and 39 of the front and rear lever are linked together by an adjustable rod 43 and the ends 34 and 38 of the levers are linked together in a similar manner by a rod 44, the rods crossing each other at an intermediate position.

In the device of Fig. 1, it being assumed that the vehicle is being pulled by a tractor or the like, it will be noted that when the tractor turns the lever 20 which forms a part of the draw bar of the driven vehicle, and is pivoted to the front axle, will be rotated slightly which rotation is communicated to the tie rod 10 and thence to the spindle arms and bodies swivelling the stub axles with the wheels mounted thereon. This movement is also simultaneously communicated to the rear wheels through the rods 14 connected to the lever 13 and 15, the rear stub axles will be swivelled in an opposite direction to that of the front axles resulting in their following in the track of the front wheels.

The same results are accomplished in the device shown in Fig. 3. Rotational movement being transmitted to the draw bar lever 32 causes the short lever 36 to thrust the tie rod 31 longitudinally. Longitudinal movement of the tie rod swivels the wheels by means of the spindle bodies, the spindle arms 30 attached thereto. The rear wheels are swivelled simultaneously with the front wheels by means of crossed rods 43 and 44 pivotally secured to the levers 33 and 34, and which have their other ends pivoted to the opposite ends 38 and 39 of the rear steering lever. The rear steering lever is pivotally secured to the rear tie rod 50, which connects the spindle arms 51 and 52 and thrusts the tie rod longitudinally in the opposite direction to that of the front tie rod.

It will thus be seen that breaking of a spring will have little or no effect upon the relative position of the axles to effect alignment of the steerable wheels which are maintained in safe parallel relation by the longitudinal adjustable rods. Swivelling of both the front and rear wheels simultaneously for a steering operation, allows the rear wheel to run directly in the tracks of the front wheels. The adjustments 53 and 54 are such as to allow the front and rear wheels to be properly adjusted.

Having thus described my invention I am aware that numerous extensive departures may be made therefrom but without departing from the spirit of my invention.

I claim:

1. A running gear unit for a land vehicle comprising spaced front and rear fixed axles, stub axles swivelly connected to the ends of each axle and wheels mounted for swiveling movement on said stub axles, each stub axle being provided with a pair of steering arms, the first arm of each stub axle extending inwardly at an acute angle to the axle when the corresponding wheel is at a right angle to the axle, the second arm of each stub axle being relatively short and extending in a line parallel to the axis of the corresponding stub axle, a cross rod pivotally connected directly to the first mentioned steering arms of the front wheels, a cross rod pivotally connected directly to the first mentioned steering arms of the rear wheels, a bar pivoted directly to the front axle and extending rearwardly of the front axle and pivotally connected at its rear end directly to the front cross rod, a pair of substantially parallel members extending lengthwise of the unit at opposite sides thereof, said members lying substantially in the horizontal plane of the cross rods throughout the distance between the axles, each member being pivotally connected at its ends to the second mentioned arms, rigid means disposed in the horizontal plane of the axles for connecting the axles and spacing them a fixed distance apart, and unrestrained springs carried by the axles for supporting a body frame disposed above the axles.

2. A running gear unit for a land vehicle comprising front and rear axles, wheels swivelly connected to the ends of each axle, each wheel being provided with a steering knuckle having a pair of steering arms, the first arm of which extends inwardly at an acute angle to the axle and the second of which arms extends parallel to the axis of the axle, a cross rod pivoted directly to the converging arms of the front wheels, a cross rod pivoted directly to the converging arms of the rear wheels, a bar pivoted directly to the front axle and to the front cross rod, a pair of members composed of pivotally connected adjustable parts, said members extending substantially parallel to each other and being connected at their ends to said second arms on the adjacent knuckles adjacent the ends of the axles, rigid means disposed in the horizontal plane of the axles for connecting the axles and spacing them a fixed distance apart, and unrestrained springs carried by the axles for supporting a body frame, each spring being located on its respective axle between the adjacent and rigid means and a steering knuckle.

LORN CAMPBELL, Jr.